(12) United States Patent
Zou et al.

(10) Patent No.: US 12,023,806 B2
(45) Date of Patent: Jul. 2, 2024

(54) SOFT ELECTROHYDRODYNAMIC ACTUATOR

(71) Applicant: ZHEJIANG UNIVERSITY, Hangzhou (CN)

(72) Inventors: Jun Zou, Hangzhou (CN); Wei Tang, Hangzhou (CN); Chao Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 689 days.

(21) Appl. No.: 17/274,446

(22) PCT Filed: Jul. 21, 2020

(86) PCT No.: PCT/CN2020/103240
§ 371 (c)(1),
(2) Date: Mar. 9, 2021

(87) PCT Pub. No.: WO2021/143085
PCT Pub. Date: Jul. 22, 2021

(65) Prior Publication Data
US 2022/0088773 A1    Mar. 24, 2022

(30) Foreign Application Priority Data

Jan. 17, 2020 (CN) .......................... 202010055470.3

(51) Int. Cl.
*B25J 9/14* (2006.01)
*F04B 43/09* (2006.01)
(52) U.S. Cl.
CPC .............. *B25J 9/142* (2013.01); *F04B 43/09* (2013.01)
(58) Field of Classification Search
CPC .. B25J 9/142; B25J 9/14; F04B 43/09; H02N 1/0002; H02N 1/0006
(Continued)

(56) References Cited

U.S. PATENT DOCUMENTS 4,480,484 A * 11/1984 Ueyama ................... G01F 1/56
73/861.08
6,359,757 B1 * 3/2002 Mallary ............... G11B 5/5552
(Continued)

FOREIGN PATENT DOCUMENTS

CN      101053147 A    10/2007
CN      105949379 A *  9/2016  ............ B01J 13/02
(Continued)

OTHER PUBLICATIONS

Wei P, "A Flexible Driving Unit And An Actuator", (2019), English Machine Translated (Year: 2019).*
(Continued)

*Primary Examiner* — Christopher M Koehler
*Assistant Examiner* — Theodore L Perkins
(74) *Attorney, Agent, or Firm* — Bayramoglu Law Offices LLC (57) ABSTRACT

A soft electrohydrodynamic actuator includes an actuating unit. The actuating unit includes a flexible pouch, a rod electrode, a dielectric fluid, an enameled wire, a hose and a planar flexible electrode. The inner cavity of the flexible pouch is provided with the rod electrode and filled with the dielectric fluid. The hose is hermetically connected to a side of the flexible pouch. The enameled wire is hermetically sleeved in the hose. One end of the enameled wire extends into the inner cavity of the flexible pouch through the hose and is electrically connected to an end of the rod electrode. The other end of the enameled wire is connected to a high-voltage positive electrode. The outer surface of the flexible pouch is coated with a layer of conductive soft material as the planar flexible electrode, or a water environment around the flexible pouch is used as the planar flexible electrode.

17 Claims, 7 Drawing Sheets

(58) Field of Classification Search
USPC .......................................................... 310/309
See application file for complete search history.

(56) References Cited

U.S. PATENT DOCUMENTS

| | | | | |
|---|---|---|---|---|
| 8,198,974 | B2* | 6/2012 | Dausch | H01H 59/0009 |
| | | | | 337/123 |
| 9,136,161 | B2* | 9/2015 | Bibl | H01L 21/6833 |
| 9,492,930 | B2* | 11/2016 | Galloway | B25J 15/12 |
| 9,605,952 | B2* | 3/2017 | Rose | B25J 9/1612 |
| 9,748,469 | B2* | 8/2017 | Lim | H10N 30/50 |
| 2003/0144656 | A1* | 7/2003 | Ocel | A61B 5/7475 |
| | | | | 606/41 |
| 2006/0262260 | A1* | 11/2006 | Majumdar | G02F 1/13439 |
| | | | | 349/122 |
| 2007/0014491 | A1* | 1/2007 | MacAuley | H05K 5/069 |
| | | | | 383/68 |

FOREIGN PATENT DOCUMENTS

| | | | |
|---|---|---|---|
| CN | 209812321 U | * | 12/2019 |
| CN | 209812321 U | | 12/2019 |
| CN | 111152210 A | | 5/2020 |
| JP | 2005223967 A | | 8/2005 |
| JP | 5186160 B2 | | 4/2013 |

OTHER PUBLICATIONS

Zhao, Qi-bin, "Nanoparticle, Surface Optical Material And Preparation Method Of Surface Optical Material", (2016), English Machine Translated (Year: 2016).*

* cited by examiner

SOFT ELECTROHYDRODYNAMIC ACTUATOR

CROSS REFERENCE TO THE RELATED APPLICATIONS

This application is the national phase entry of International Application No. PCT/CN2020/103240, filed on Jul. 21, 2020, which is based upon and claims priority to Chinese Patent Application No. 202010055470.3, filed on Jan. 17, 2020, the entire contents of which are incorporated herein by reference.

TECHNICAL FIELD

The present invention relates to the fields of soft robotics and soft materials, and in particular to a soft electrohydrodynamic actuator.

BACKGROUND

Compared with traditional rigid robots, soft robots are made of soft materials and have significant advantages in adapting to complex environments, performing autonomous tasks and imitating motions and functions of biological systems. Moreover, soft robots also have promising application prospects in human-computer interaction devices. The core of a soft robot is its soft actuators, but existing soft actuators are difficult to attain a trade-off between safety, reliability, controllability, durability, versatility, quick response and muscle-like actuation characteristics.

Existing soft actuators are mainly classified into three types: fluidic actuators, dielectric elastomer actuators, and smart material actuators stimulated by sound, light, electromagnetic heat, and the like. The fluidic actuators include soft pneumatic actuators and soft hydraulic actuators. Such actuators have large output forces and are easy to accomplish a variety of deformation motions, but are actuated by bulky external compressors or pumps to deliver fluid through pipes, which greatly limits their response speeds, efficiency and portability. The dielectric elastomer actuators have a fast response speed and large output strain, but have restricted safe and reliable applications due to their unstable breakdown and exposed high-voltage electrodes. The smart material actuators stimulated by sound, light, electromagnetic heat, and the like, such as shape memory alloys, have large output forces and high power density ratios, but the shape memory alloys are thermally actuated and thus are difficult to accurately control.

SUMMARY

In order to solve the problems identified in the prior art, the technical problem to be solved by the present invention is to provide a soft electrohydrodynamic actuator to solve the problems that the existing soft actuators cannot attain a combination of safety, reliability, controllability, durability, versatility, quick response and muscle-like actuation characteristics.

The technical solution for achieving the objective of the present invention is as follows.

The present invention includes at least one actuating unit. Each actuating unit includes a flexible pouch, a rod electrode, a dielectric fluid, an enameled wire, a hose and a planar flexible electrode. The flexible pouch is a deformed body of the actuator, and the inner cavity of the flexible pouch is configured as a closed electrode region. The inner cavity of the flexible pouch is provided with the rod electrode and filled with the dielectric fluid. The hose is hermetically connected to a side of the flexible pouch, and the enameled wire is hermetically sleeved in the hose. One end of the enameled wire extends into the inner cavity of the flexible pouch through the hose and is electrically connected to an end of the rod electrode, and the other end of the enameled wire is connected to a high-voltage positive electrode. When the soft electrohydrodynamic actuator is used in the air, the outer surface of the flexible pouch is coated with a layer of conductive soft material as the planar flexible electrode, and the planar flexible electrode is connected to a grounding electrode. When the soft electrohydrodynamic actuator is used in water, the flexible pouch is placed in water, and a water environment around the flexible pouch is used as the planar flexible electrode without other materials.

The rod electrode in the inner cavity of the flexible pouch and the planar flexible electrode outside the flexible pouch constitute two poles of a closed electrode region. The high-voltage positive electrode is applied to the rod electrode through the enameled wire to actuate the flow of the dielectric fluid in the closed electrode region and to drive and to deform the flexible pouch.

The flexible pouch is formed by hermetically connecting the edges of two membrane materials.

When the two membrane materials are the same in material, shape and size, the two membrane materials form film materials with the same ductility, and the soft electrohydrodynamic actuator produces a stretching motion.

When the two membrane materials are different in at least one of material, shape and size, the two membrane materials form film materials with different ductility, and the soft electrohydrodynamic actuator produces a bending motion.

A gap is reserved at the edge joint between the two membrane materials, the dielectric fluid is injected through the gap by using a syringe, and then the gap is sealed to finally form the flexible pouch.

The soft electrohydrodynamic actuator includes a plurality of actuating units connected in series.

The soft electrohydrodynamic actuator includes a plurality of actuating units connected in parallel.

The flexible pouch is made of a flexible membrane material.

The rod electrode is made of a conductive material.

The dielectric fluid is a fluid capable of producing an electrohydrodynamic effect.

The planar flexible electrode is a spreadable conductive stretchable material.

The present invention includes at least one actuating unit. Each actuating unit includes a flexible pouch, a rod electrode, a dielectric fluid, an enameled wire, a hose and a planar flexible electrode. The flexible pouch is a deformed body of the actuator, and the inner cavity of the flexible pouch is configured as a closed electrode region. The inner cavity of the flexible pouch is provided with the rod electrode and filled with the dielectric fluid. The rod electrode and the dielectric fluid are sealed in the flexible pouch. The hose is hermetically connected to a side of the flexible pouch, and the connection part between the side of the flexible pouch and the hose is sealed at the edge joint of the flexible pouch. The enameled wire is hermetically sleeved in the hose. One end of the enameled wire extends into the inner cavity of the flexible pouch through the hose and is electrically connected to an end of the rod electrode. The other end of the enameled wire is connected to a high-voltage positive electrode, and the high-voltage positive electrode is applied to the rod electrode through the enameled wire. The hose is sleeved outside the enameled wire for high-voltage insulation and sealing of the enameled wire. The enameled wire is used as a conductor, and the dielectric fluid is configured for transmission and actuation.

When the soft electrohydrodynamic actuator is used in the air, the outer surface of the flexible pouch is coated with a layer of conductive soft material as the planar flexible electrode, and the planar flexible electrode is connected to a grounding electrode. When the soft electrohydrodynamic actuator is used in water, the flexible pouch is placed in water, and a water environment around the flexible pouch is used as the planar flexible electrode without other materials.

The rod electrode in the inner cavity of the flexible pouch and the planar flexible electrode outside the flexible pouch constitute two poles of a closed electrode region. The high-voltage positive electrode is applied to the rod electrode through the enameled wire to actuate the flow of the dielectric fluid in the closed electrode region and to drive and to deform the flexible pouch.

The flexible pouch is formed by hermetically connecting the edges of two membrane materials. The shape and size of the two membrane materials are set according to the actual requirement, and the shape may be rectangular, trapezoidal, oval, or the like.

When the two membrane materials are the same in material, shape and size, the two membrane materials form film materials with the same ductility, and the soft electrohydrodynamic actuator produces a stretching motion.

When the two membrane materials are different in at least one of material, shape and size, the two membrane materials form film materials with different ductility, and the soft electrohydrodynamic actuator produces a bending motion.

A gap is reserved at the edge joint between the two membrane materials. After the flexible pouch is formed, the dielectric fluid is injected through the gap by using a syringe, and then the gap is sealed to finally form the flexible pouch.

The soft electrohydrodynamic actuator includes a plurality of actuating units connected in series. Flexible pouches of the plurality of actuating units may be integrally formed to increase the output displacement of the actuator.

The soft electrohydrodynamic actuator includes a plurality of actuating units connected in parallel. The two ends of the flexible pouches of the plurality of actuating units in the deformation direction are fixed to increase the output force of the actuator.

The flexible pouch is made of a flexible membrane material such as silicone rubber, polydimethylsiloxane (PDMS), or gel.

The rod electrode is made of a conductive material such as a copper wire, a tungsten wire, a hydrogel, a carbon nanotube, or conductive silica gel.

The dielectric fluid is a fluid capable of producing an electrohydrodynamic effect, such as triacetin or liquid crystal.

The planar flexible electrode is a spreadable conductive stretchable material such as black carbon paste, a hydrogel, or water.

The actuator of the present invention is an electrically-responsive smart fluid actuator based on new actuation and deformation principles. The present invention integrates a pump, a pipeline and an actuator into a single unit and effectively exploits the advantages of electrohydrodynamic flow. It solves problems of prior actuators, including leakage, slow response and other inefficiencies and thus has promising application prospects in the field of soft robotics.

Compared with the prior art, the present invention has the following significant advantages.

(1) The actuator of the present invention is an electrically-responsive smart fluid actuator combining the advantages of a fluidic actuator, a dielectric elastomer actuator and a smart material actuator while solving the shortcomings of those actuators. The new actuator has a combination of safety, reliability, controllability, durability, versatility, quick response and muscle-like actuation characteristics.

(2) The actuator of the present invention can achieve different deformation modes such as elongation and bending by changing the configuration of the membranes, and can be fabricated by a common bonding method. Moreover, the membrane materials and electrode materials are readily available.

(3) The actuator of the present invention has a high-voltage positive electrode that is sealed in the dielectric fluid and further insulated through the flexible pouch. Therefore, the actuator has high adaptability, can be used in water or air, and thus has promising application prospects in the field of soft robotics.

BRIEF DESCRIPTION OF THE DRAWINGS

The present invention is further described in detail below with reference to the drawings.

In the figures, (1): flexible pouch; (2): rod electrode; (3): dielectric fluid; (4): enameled wire; (5): hose; (7): planar flexible electrode; (101) and (102): membrane material.

DETAILED DESCRIPTION OF THE EMBODIMENTS

In order to illustrate the technical solutions and technical objectives of the present invention, the present invention is further introduced below with reference to the drawings and specific embodiments.

Figure 1:
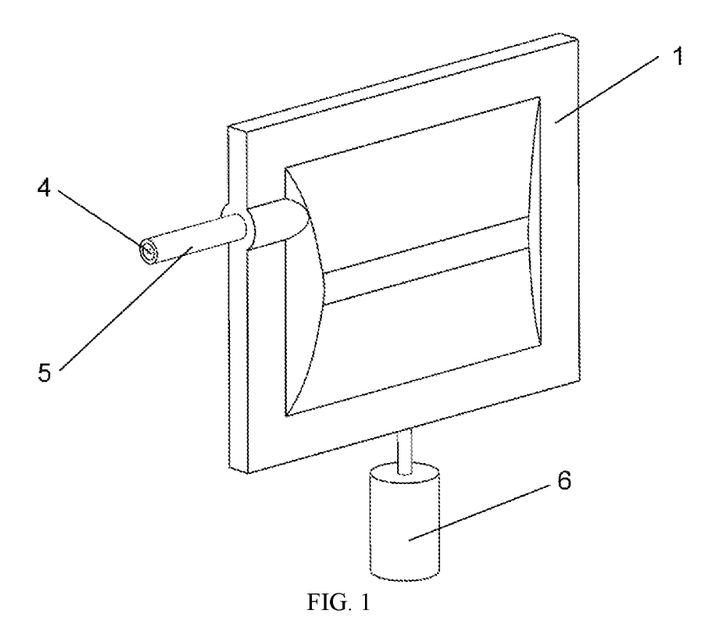
FIG. 1 is a perspective view of the structure of a soft electrohydrodynamic actuator according to the present invention.

As shown in FIG. 1, in a specific implementation, the soft electrohydrodynamic actuator includes at least one actuating unit. Each actuating unit includes the flexible pouch 1, the rod electrode 2, the dielectric fluid 3, the enameled wire 4, the hose 5 and the planar flexible electrode 7. The flexible pouch 1 is a deformed body of the actuator. The inner cavity of the flexible pouch 1 is configured as a closed electrode region. The inner cavity of the flexible pouch 1 is provided with the rod electrode 2 and filled with the dielectric fluid 3. The rod electrode 2 and dielectric fluid 3 are sealed in the flexible pouch 1. The hose 5 is hermetically connected to a side of the flexible pouch 1, and the connection part between the side of the flexible pouch 1 and the hose 5 is sealed at the edge joint of the flexible pouch 1. The enameled wire 4 is hermetically sleeved in the hose 5. One end of the enameled wire 4 extends into the inner cavity of the flexible pouch 1 through the hose 5 and is electrically connected to an end of the rod electrode 2. The other end of the enameled wire 4 is connected to a high-voltage positive electrode. The hose 5 is sleeved outside the enameled wire 4 for high-voltage insulation and sealing of the enameled wire 4. The enameled wire 4 is used as a conductor, and the dielectric fluid 3 is configured for transmission and actuation.

Figure 2A:
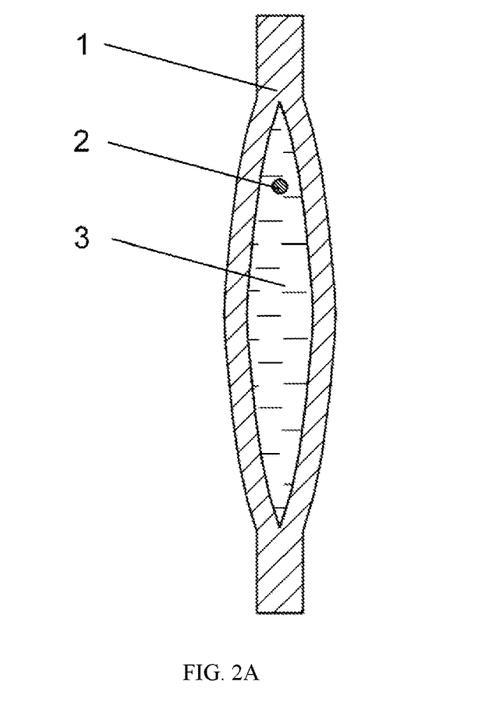
FIG. 2A is a cross-sectional view of the actuator used in water with a rod electrode and two membrane materials assembled.

As shown in FIG. 2A, when the soft electrohydrodynamic actuator is used in water, the flexible pouch 1 is placed in water, the water environment around the flexible pouch 1 is used as the planar flexible electrode 7 without other materials, and the water is used as a grounding electrode.

Figure 2B:
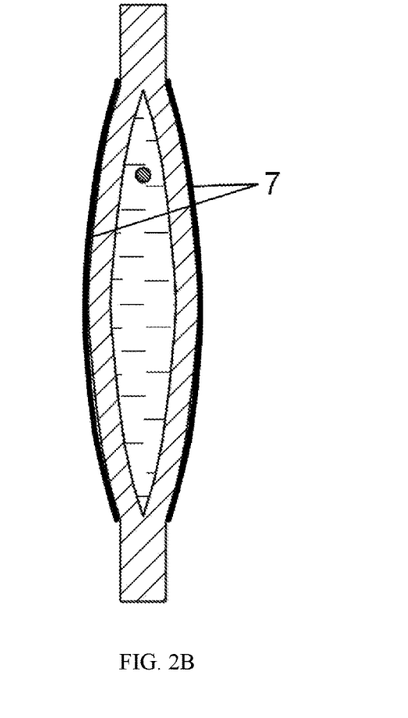
FIG. 2B is a cross-sectional view of the actuator used in the air when spreading a planar flexible electrode according to the present invention.

As shown in FIG. 2B, when the soft electrohydrodynamic actuator is used in the air, the outer surface of the flexible pouch 1 is coated with a layer of conductive soft material as the planar flexible electrode 7, and the planar flexible electrode 7 is connected to a grounding electrode.

In this way, the soft electrohydrodynamic actuator of the present invention has strong adaptability and can be used in water and air. In a specific implementation, the planar flexible electrode 7 is determined according to the actual situation.

The rod electrode 2 in the inner cavity of the flexible pouch 1 and the planar flexible electrode 7 outside the flexible pouch 1 constitute two poles of a closed electrode region. The high-voltage positive electrode is applied to the rod electrode 2 through the enameled wire 4 to actuate the dielectric fluid 3 to flow in the closed electrode region to drive the flexible pouch 1 to deform to implement actuation, which solves the problem of extremely limited flow of traditional electrohydrodynamic pumps.

Figure 4A:
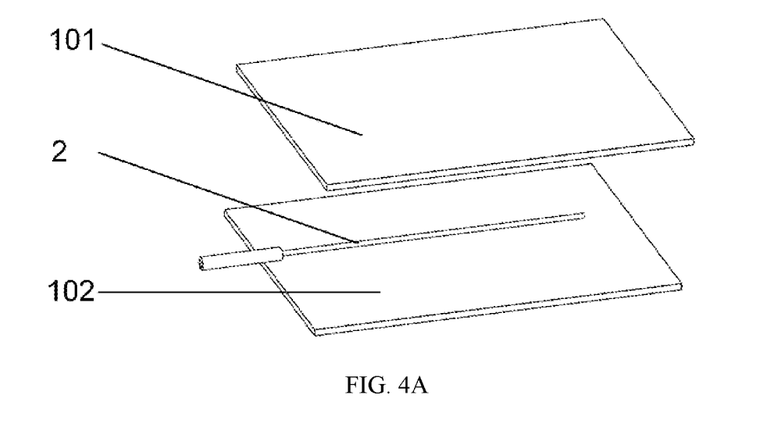
FIG. 4A is a schematic diagram of the process of fabricating a flexible pouch of the actuator according to the present invention.

As shown in FIG. 4A, the flexible pouch 1 is formed by hermetically connecting the edges of two membrane materials 101, 102. The shape and size of the two membrane materials 101, 102 are set according to the actual requirement, and the shape may be rectangular, trapezoidal, oval, or the like.

Figure 3:
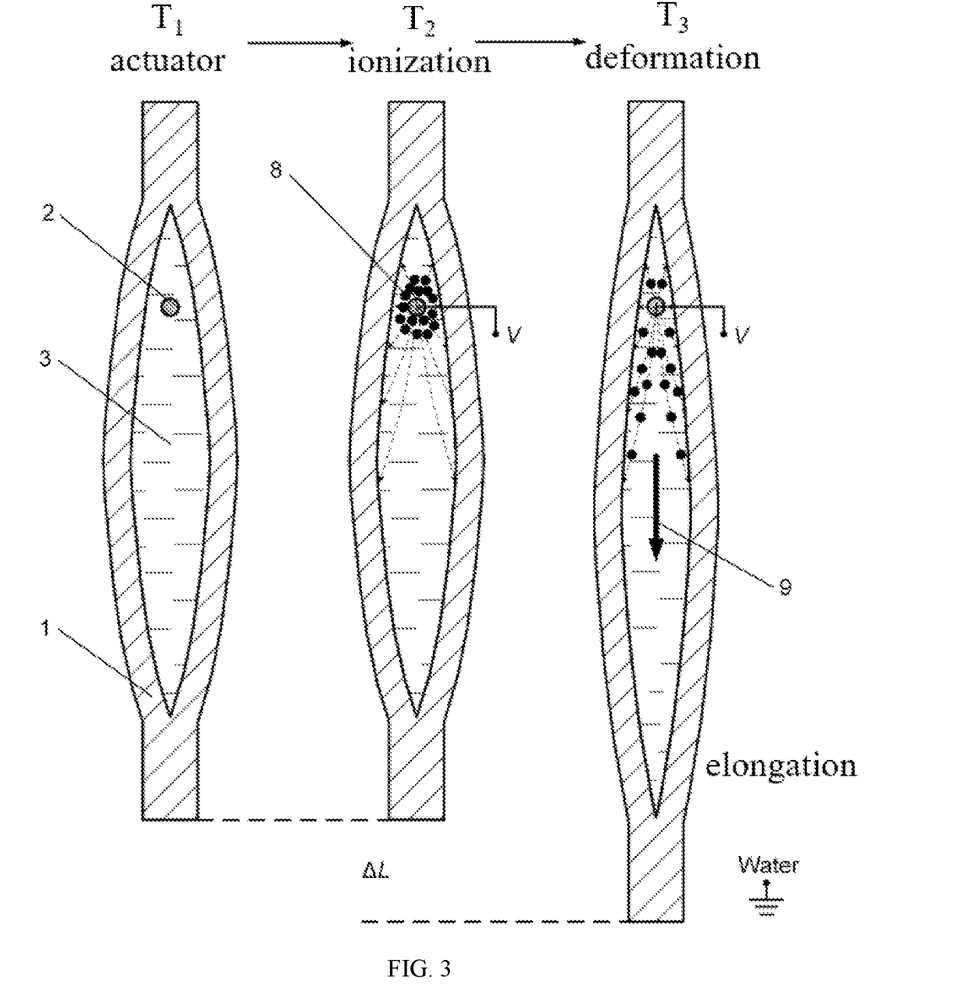
FIG. 3 is a schematic diagram of the deformation of the actuator according to the present invention.

As shown in FIG. 3, when the two membrane materials 101, 102 are the same in material, shape and size, the two membrane materials 101, 102 form film materials 103, 104 with the same ductility, and the soft electrohydrodynamic actuator produces a stretching motion.

Figure 5A:
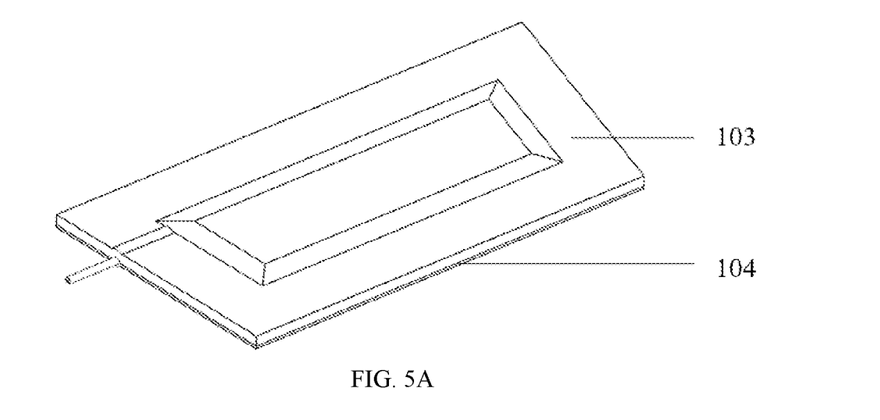
FIG. 5A is a perspective view of the actuator when producing a bending motion according to the present invention.
Figure 5B:
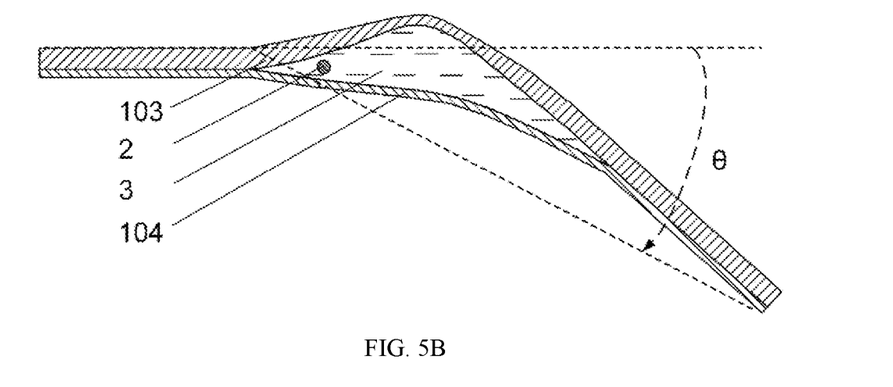
FIG. 5B is a cross-sectional view of the actuator subjected to a bending deformation when producing a bending motion according to the present invention.

As shown in FIG. 5A and FIG. 5B, when the two membrane materials 101, 102 are different in at least one of material, shape and size, the two membrane materials 101, 102 form film materials 103, 104 with different ductility, and the soft electrohydrodynamic actuator produces a bending motion.

Figure 4B:
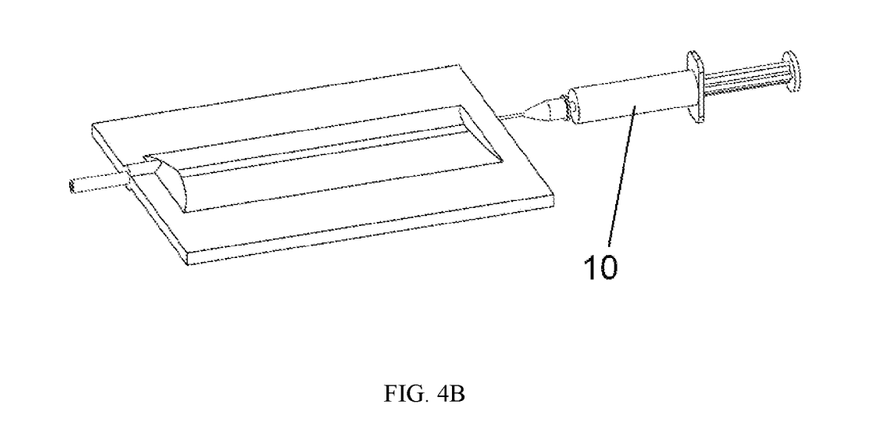
FIG. 4B is a schematic diagram of the process of injecting a dielectric fluid into the actuator according to the present invention.

As shown in FIG. 4A and FIG. 4B, in a specific implementation, the rod electrode 2, the enameled wire 4, the hose 5 and the two membrane materials 101, 102 are bonded at the edges to form a cavity structure. As shown in FIG. 4A, the actuator is fabricated by a common bonding method as follows: firstly, the enameled wire 4 is inserted into the hose 5, both ends of the enameled wire 4 are peeled, and then one end of the enameled wire 4 is connected to the rod electrode 2. Next, the two prepared membrane materials 101, 102 are bonded to the edges of the enameled wire 4, the hose 5 and the rod electrode 2 that have been connected, and a gap is reserved at the edge joint. Finally, as shown in FIG. 4B, the dielectric fluid 3 is injected through the gap by using the syringe 10, and then the gap is sealed.

A heavy object is connected to the bottom of the flexible pouch 1, and the heavy object may be the weight 6. As shown in FIG. 1, when the two membrane materials 101, 102 of the flexible pouch 1 are the same, the soft electrohydrodynamic actuator produces an elongation motion, and the weight 6 is hung on the bottom of the flexible pouch 1 to exhibit the output performance of the deformation actuation.

Referring to FIG. 3, FIG. 5A and FIG. 5B, the actuator is operated in water and the water is used as a grounding electrode. When a high voltage is applied to the rod electrode 2, an electrostatic field is formed in the closed cavity, and some dielectric fluid molecules are ionized into the ions 8 around the rod electrode 2. In this case, under the action of the electrostatic field, the ions 8 migrate along the electrostatic field while dragging a large number of fluid molecules around to cause the electrohydrodynamic flow 9. This flow effect directly facilitates the deformation of the flexible pouch. When the two membranes of the flexible pouch 1 are the same, the actuator produces an elongation deformation, as shown in FIG. 3. When the two membranes of the flexible pouch 1 are different, the actuator produces a bending deformation, as shown in FIG. 5A and FIG. 5B. Upon experimental verification, the actuator is tested in water under a voltage V of 16 kV: an elongation actuator produces a linear deformation $\Delta L$ of 24%, which is 20% of the typical deformation of skeletal muscle, and has a response time of 60 ms; and a bending actuator has a bending angle $\theta$ of 35.2° and a response time of 197 ms.

Figure 6A:
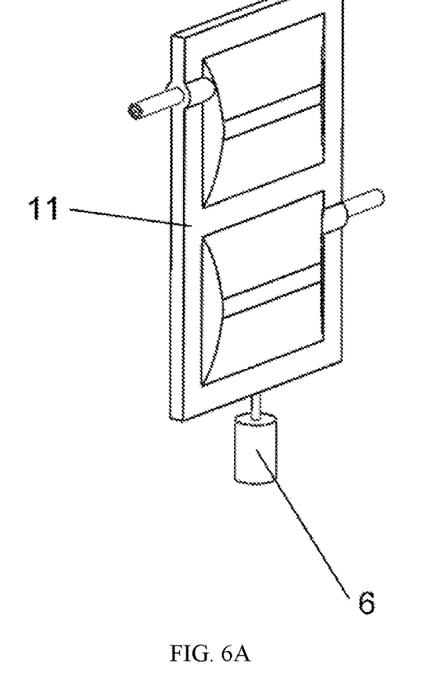
FIG. 6A is a perspective view of an actuator with two actuating units connected in series to increase the output force according to the present invention.
Figure 6B:
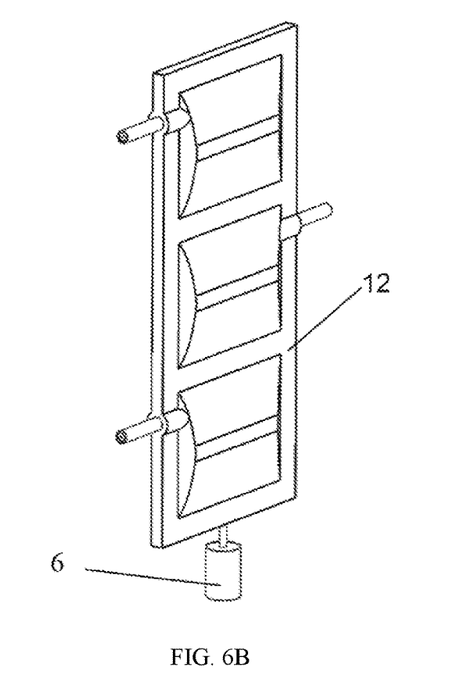
FIG. 6B is a perspective view of an actuator with three actuating units connected in series to increase the output force according to the present invention.

Referring to FIG. 6A and FIG. 6B, the soft electrohydrodynamic actuator may increase the output displacement through a series connection of a plurality of cavities, such as two, three or more cavities. As shown in FIG. 6A, two actuating units are connected in series to form the soft electrohydrodynamic actuator 11. As shown in FIG. 6B, three actuating units are connected in series to form the soft electrohydrodynamic actuator 12, and the hoses 5 of these vertically adjacent actuating units are arranged in different positions and located on both sides, respectively. Moreover, the bending electrohydrodynamic actuator may also increase the bending angle $\theta$ through a series connection of a plurality of cavities.

Figure 7A:
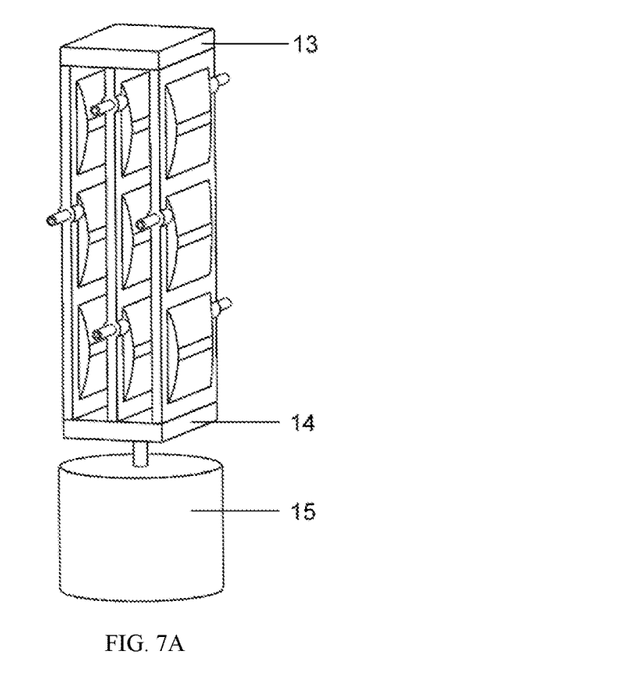
FIG. 7A is a perspective view of the actuator that increases the output force through a parallel connection according to the present invention.
Figure 7B:
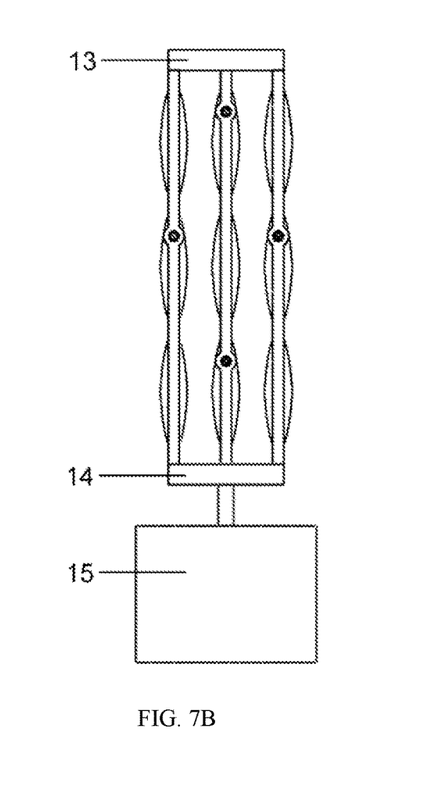
FIG. 7B is a side view of the actuator that increases the output force through the parallel connection according to the present invention.

Referring to FIG. 7A and FIG. 7B, the soft electrohydrodynamic actuator may increase the output force through a parallel connection of a plurality of cavities, such as two, three or more cavities. The plurality of cavities are fixed by the upper fixed end 13 and the lower fixed end 14, and a plurality of actuating units are connected in parallel to actuate the heavier weight 15. Certainly, the bending electrohydrodynamic actuator may also increase the output force through a parallel connection of a plurality of cavities.

Although the present invention has been disclosed above through the preferred embodiments, the embodiments are not intended to limit the present invention. Those of ordinary skill in the art can make various changes and modifications without departing from the spirit and scope of the present invention. Therefore, the scope of protection of the present invention shall be subject to the scope as defined in the claims.

What is claimed is:

1. A soft electrohydrodynamic actuator, comprising:
   at least one actuating unit;
   wherein
   each actuating unit of the at least one actuating unit comprises a flexible pouch, a rod electrode, a dielectric fluid, an enameled wire, a hose and a planar flexible electrode;
   the flexible pouch is a deformed body of the soft electrohydrodynamic actuator, and an inner cavity of the flexible pouch is configured as a closed electrode region;
   the inner cavity of the flexible pouch is provided with the rod electrode and the inner cavity of the flexible pouch is filled with the dielectric fluid;
   the hose is hermetically connected to a side of the flexible pouch, and the enameled wire is hermetically sleeved in the hose;
   a first end of the enameled wire extends into the inner cavity of the flexible pouch through the hose and then the first end of the enameled wire is electrically connected to an end of the rod electrode, and a second end of the enameled wire is connected to a high-voltage positive electrode; and
   when the soft electrohydrodynamic actuator is used in air, an outer surface of the flexible pouch is coated with a layer of a conductive soft material as the planar flexible electrode, and the planar flexible electrode is connected to a grounding electrode; or
   when the soft electrohydrodynamic actuator is used in water, the flexible pouch is placed in the water, and a water environment around the flexible pouch is used as the planar flexible electrode without the conductive soft material; and
   the rod electrode in the inner cavity of the flexible pouch and the planar flexible electrode outside the flexible pouch constitute two poles of the closed electrode region; and
   the high-voltage positive electrode applies a high voltage to the rod electrode through the enameled wire to form an electrostatic field in the inner cavity, ionize dielectric fluid molecules into ions around the rod electrode, and cause the ions around the rod electrode to migrate along the electrostatic field while dragging a number of fluid molecules and actuate a flow of the dielectric fluid in the closed electrode region, which drives a deformation of the flexible pouch.

2. The soft electrohydrodynamic actuator according to claim 1, wherein
   the flexible pouch is formed by hermetically connecting edges of two membrane materials; and
   when the two membrane materials are the same in material, shape, and size, the two membrane materials form film materials with the same ductility, and the soft electrohydrodynamic actuator produces a stretching motion; or
   when the two membrane materials are different in at least one of material, shape, or size, the two membrane materials form film materials with different ductility, and the soft electrohydrodynamic actuator produces a bending motion.

3. The soft electrohydrodynamic actuator according to claim 2, wherein
   the flexible pouch is made of a flexible membrane material.

4. The soft electrohydrodynamic actuator according to claim 2, wherein
   the rod electrode is made of a conductive material.

5. The soft electrohydrodynamic actuator according to claim 2, wherein
   a gap is reserved at an edge joint between the two membrane materials, the dielectric fluid is injected through the gap by using a syringe, and then the gap is sealed to finally form the flexible pouch.

6. The soft electrohydrodynamic actuator according to claim 5, wherein
   the flexible pouch is made of a flexible membrane material.

7. The soft electrohydrodynamic actuator according to claim 5, wherein
   the rod electrode is made of a conductive material.

8. The soft electrohydrodynamic actuator according to claim 1, comprising:
   a plurality of actuating units connected in series.

9. The soft electrohydrodynamic actuator according to claim 8, wherein
   the flexible pouch is made of a flexible membrane material.

10. The soft electrohydrodynamic actuator according to claim 8, wherein
    the rod electrode is made of a conductive material.

11. The soft electrohydrodynamic actuator according to claim 1, comprising:
    a plurality of actuating units connected in parallel.

12. The soft electrohydrodynamic actuator according to claim 11, wherein
    the flexible pouch is made of a flexible membrane material.

13. The soft electrohydrodynamic actuator according to claim 11, wherein
    the rod electrode is made of a conductive material.

14. The soft electrohydrodynamic actuator according to claim 1, wherein
    the flexible pouch is made of a flexible membrane material.

15. The soft electrohydrodynamic actuator according to claim 1, wherein
    the rod electrode is made of a conductive material.

16. The soft electrohydrodynamic actuator according to claim 1, wherein
    the dielectric fluid is a fluid configured to produce an electrohydrodynamic effect.

17. The soft electrohydrodynamic actuator according to claim 1, wherein
    the planar flexible electrode is a spreadable conductive stretchable material.

* * * * *